(12) United States Patent
Cohen (10) Patent No.: US 7,650,411 B2
(45) Date of Patent: *Jan. 19, 2010

(54) METHOD AND SYSTEM FOR SECURE MANAGEMENT AND COMMUNICATION UTILIZING CONFIGURATION NETWORK SETUP IN A WLAN

(75) Inventor: David Cohen, Sunnyvale, CA (US)

(73) Assignee: Broadcom Corporation

( * ) Notice: Subject to any disclaimer, the term of this patent is extended or adjusted under 35 U.S.C. 154(b) by 0 days.

This patent is subject to a terminal disclaimer.

(21) Appl. No.: 12/029,186

(22) Filed: Feb. 11, 2008

(65) Prior Publication Data
US 2008/0140814 A1 Jun. 12, 2008

Related U.S. Application Data

(63) Continuation of application No. 11/207,301, filed on Aug. 18, 2005, now Pat. No. 7,343,411.

(60) Provisional application No. 60/602,396, filed on Aug. 18, 2004, provisional application No. 60/671,120, filed on Apr. 14, 2005.

(51) Int. Cl.
*G06F 13/00* (2006.01)
(52) U.S. Cl. .................. 709/225; 709/217; 709/224; 709/227
(58) Field of Classification Search .......... 709/217, 709/219, 223, 225, 227, 229, 250
See application file for complete search history.

(56) References Cited

U.S. PATENT DOCUMENTS 6,061,563 A * 5/2000 Lee .................. 455/435.1

| 6,970,719 | B1* | 11/2005 | McConnell et al. ...... 455/554.1 |
| 7,103,333 | B2 | 9/2006 | Lazaridis et al. |
| 2003/0217289 | A1 | 11/2003 | Ammon et al. |
| 2004/0039526 | A1 | 2/2004 | Inbar et al. |
| 2004/0117466 | A1 | 6/2004 | Bodin et al. |
| 2004/0249977 | A1 | 12/2004 | Minamisawa |
| 2005/0071426 | A1 | 3/2005 | Shah |
| 2006/0034235 | A1* | 2/2006 | Yamane ................ 370/338 |
| 2006/0040656 | A1 | 2/2006 | Kotzin |

OTHER PUBLICATIONS

Lan Man Standards Committee of the IEEE Computer Society, ANS/IEEE Std. 802.11, Part 11, "Wireless LAN Medium Access Control (MAC) and Physical Layer (PHY) Specifications", 1999 Edition (R2003), pp. 9-65.

* cited by examiner

*Primary Examiner*—Viet Vu
(74) *Attorney, Agent, or Firm*—McAndrews, Held & Malloy, Ltd.

(57) ABSTRACT

A method for enabling communication of information in a secure communication system may include generating a notification when at least two configurators attempt to separately register with an 802.11 client station within a single configurator timing window. The method may further include detecting whether the at least two configurators attempt to register within the 802.11 client station within the single configurator timing window time duration. The notification may be generated in response to the detecting. The 802.11 client station may receive configuration information from at least a first of the at least two configurators, prior to the generation of the notification. The configuration information may include one or both of a service set identifier (SSID) and/or a passphrase. The notification may include an indication of detected multiple configurators.

42 Claims, 10 Drawing Sheets

FIG. 7

METHOD AND SYSTEM FOR SECURE MANAGEMENT AND COMMUNICATION UTILIZING CONFIGURATION NETWORK SETUP IN A WLAN

This application is a continuation of U.S. patent application Ser. No. 11/207,301 filed Aug. 18, 2005, which makes reference to, claims priority to, and claims the benefit of:
U.S. Provisional Application Ser. No. 60/602,396 filed Aug. 18, 2004; and
U.S. Provisional Application Ser. No. 60/671,120 filed Apr. 14, 2005.

U.S. patent application Ser. No. 11/207,262 filed Aug. 18, 2005; U.S. patent application Ser. No. 11/207,658 filed Aug. 18, 2005; U.S. patent application Ser. No. 11/208,081 filed Aug. 18, 2005; U.S. application Ser. No. 11/208,310 filed Aug. 18, 2005; U.S. application Ser. No. 11/208,275 filed Aug. 18, 2005; U.S. application Ser. No. 11/208,346 filed Aug. 18, 2005; U.S. application Ser. No. 11/207,661 filed Aug. 18, 2005; U.S. application Ser. No. 11/207,302 filed Aug. 18, 2005; U.S. application Ser. No. 11/208,284 filed Aug. 18, 2005; and U.S. application Ser. No. 11/208,347 filed Aug. 18, 2005. The complete subject matter of the above-identified applications are hereby incorporated herein by reference in their entirety.

All of the above referenced applications are hereby incorporated herein by reference in their entirety.

FIELD OF THE INVENTION

Certain embodiments of the invention relate to wireless network communication. More specifically, certain embodiments of the invention relate to a method and system for secure management and communication utilizing configuration network setup in a wireless local area network (WLAN).

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a station (STA) to associate to an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name or service set identifier (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

Since configuration provides an opportune time for breaching a network, mechanisms that simplify the tasks associated with detecting security breaches and establishing a secure configuration process may reduce the time and/or the cost of setting up and/or expanding a wireless network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for secure management and communication utilizing configuration network setup in a wireless local area network (WLAN), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for secure management and communication utilizing configuration network setup in a wireless local area network (WLAN). Prior to establishing a secure communication configuration between a configurator and a client station in a wireless network, an intermediary agent may attempt to establish an unauthorized connection with either the configurator or the client station. For example, the intermediary agent may be a rogue configurator and may attempt to establish a connection with the client station. Similarly, the intermediary agent may be a rogue client station and may attempt to establish a connection with the configurator.

In an exemplary embodiment of the invention, if a rogue configurator attempts to establish a secure connection with a client station in a wireless network, the client station may be adapted to detect the unauthorized attempt at the time the legitimate configurator attempts to connect with the client station. In addition, if a configurator establishes a connection with a rogue client station, a legitimate client station may be adapted to detect the unauthorized access attempt by the rogue client station at the time, or before, the legitimate client station receives authentication enablement information from the configurator. If an undesired device such as a rogue client station or a rogue configurator is detected, the legitimate client station may communicate a notification within the wireless network. A remedial action, such as canceling all or any suspect established connections or preventing the rogue configurator client from connecting or joining the legitimate network, may then be taken based on the communicated notification.

In IEEE 802.11 WLAN systems, wireless terminal devices, or wireless terminals, for example personal computers or personal digital assistants, may communicate via radio frequency (RF) channels that may be monitored by unauthorized parties at terminal devices that were not intended to participate in the communication. Components in a system, in accordance with an embodiment of the invention, may comprise a configurator, which may alternatively be referred to as a configurator terminal, configurator device, or configurator, and a client, which may be alternatively referred to as a client terminal, client device, or client station. A configurator, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure client stations, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN. If a configurator is located inside an access point, the device may be referred to as a collocated configurator and access point. A collocated configurator and access point may be adapted to function as an access point or as a configurator. Throughout this application, for simplicity, a collocated configurator and access point may be referred to as a collocated device. Accordingly, a collocated device functioning as an access point refers to the collocated configurator and access point functioning as an access point. Additionally, a collocated device functioning as a configurator refers to the collocated configurator and access point functioning as a configurator.

IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Authentication may comprise a process of steps that identify a user of a wireless terminal device. Enabling a user of a wireless terminal device to obtain authorization and to utilize encryption may require the user to manually configure the wireless terminal. The manual configuration, however, may require a user to possess a level of knowledge about the WLAN that may exceed that of a typical user.

Figure 1A:
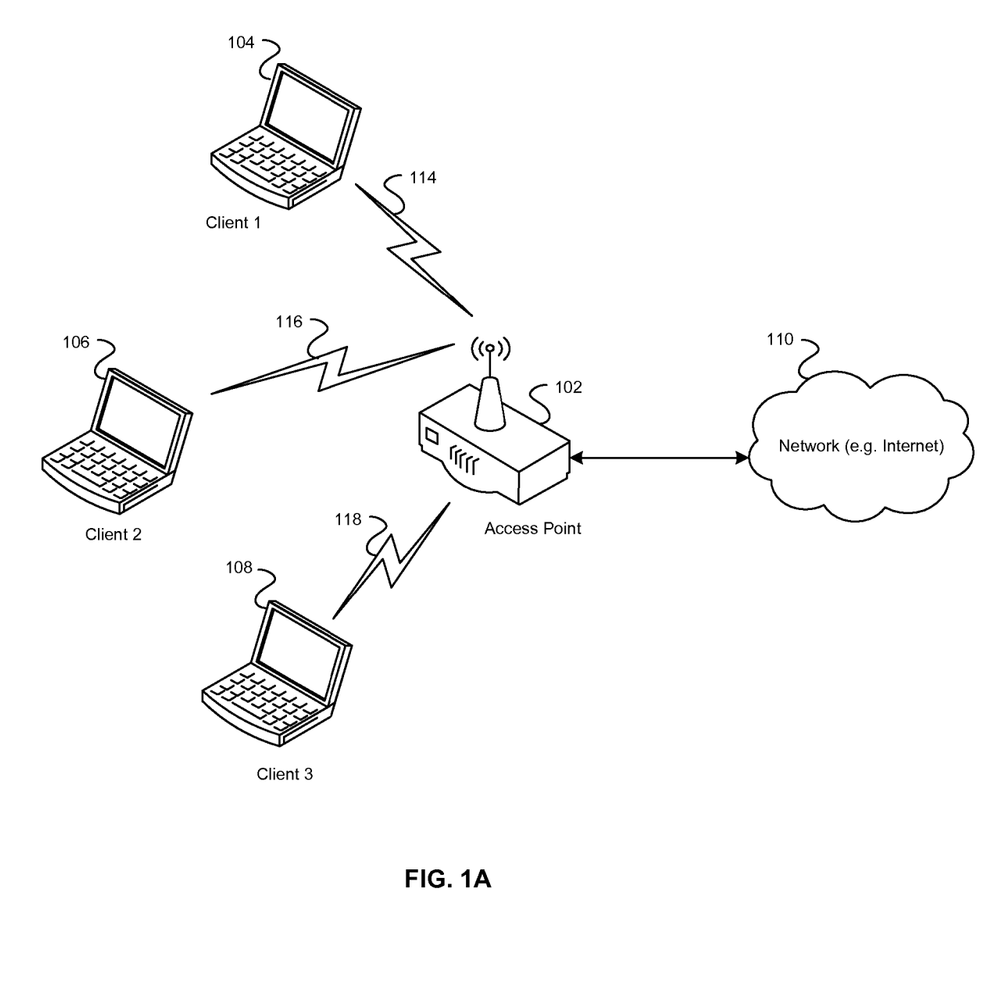
FIG. 1A is a block diagram of an exemplary wireless network, which may be utilized in connection with an embodiment of the invention.

FIG. 1A is a block diagram of an exemplary wireless network, which may be utilized in connection with an embodiment of the invention. Referring to FIG. 1A, there is shown an access point (AP) 102, and a plurality of client stations (STA) 104, 106, and 108, a plurality of RF channels 114, 116, and 118, and a network 110. In various embodiments of the invention, an access point 102 may also be referred to as a configurator or configurator. The STAs 104, 106, and 108 may be wireless terminals. In various embodiments of the invention, the client stations 104, 106, and 108 may also be referred to as clients. The network 110 may be a private or public network, for example, the Internet. The configured STAs 104, 106, and 108 may communicate with the AP 102 via corresponding secure RF channels 114, 116, and 118. The AP 102 may communicate information received from a configured STA 104, 106, or 108 via the Internet 110. An unconfigured STA 104, 106, or 108 may communicate with the configurator 102 to request configuration information. The configurator 102 may configure a requesting STA 104, 106, or 108 via a corresponding RF channel 114, 116, or 118.

In general, the AP 102 may be adapted to facilitate the registration and/or authentication of client stations so that the client stations may become associated with the AP 102 in secure communications network. Various embodiments of the invention may comprise software that executes in the AP 102 and/or client station 104 in order to facilitate registration and/or authentication. The software may enable the AP 102 to register client stations 104 in a secure communications network. An AP 102 may register a client station 104 by storing information, for example a media access control (MAC) address or an Internet protocol (IP) address, associated with the client station 104. Registration may also comprise configuration of the client station 104 by the AP 102.

An AP 102 may configure a client station 104 by performing software configuration tasks that enable the client station 104 to communicate information to another STA 106 in a secure communications network. In one embodiment of the invention, exemplary software configuration tasks may comprise generating a preshared key (PSK) at an AP 102 and communicating the PSK securely, to the client station 104. The PSK may be utilized to encrypt information communicated by STAs in a secure communications network. The secure communications network may comprise the AP 102, and one or more client stations such as client station 104, that are configured by the AP 102. A system for secure automatic registration in a communications network may comprise an access point 102 that registers a client device 104 without requiring that software configuration tasks be performed by an end user. In this regard, an end user does not have to manually enter configuration information on the AP 102 and/or the client station 104 in order to register and authenticate the client station 104.

In various embodiments of the invention, activating a hardware button and/or software button may register a client station 104 with an AP 102. This may comprise activating a hardware and/or software enabled button located on an AP 102, and by activating a hardware and/or software enabled button located on a client station 104. A hardware button may comprise a physical button that may be dedicated to performing a function related to automatic registration security. A software enabled button may comprise a software icon that appears on a user interface. A hardware button and/or software enabled button may be activated as a result of a method of physical action on the part of a user. Activation of a hardware and/or software enabled button located on an AP 102, and subsequent activation of a hardware and/or software enabled button located on a client station 104, may result in a registering of the client station 104 with the AP 102. The client station 104 may also be configured, by the AP 102, to communicate information in a secure communications network.

Some IEEE 802.11 WLANs utilize a technology for network security based on Wi-Fi protected access (WPA), or second generation WPA (WPA2). For example, configuration parameters, such as a PSK or SSID, may require manual entry by a user at an AP 102 and/or at a client station 104 in some conventional WPA-based WLANs. In various embodiments of the invention, in order to provide support for WPA, the PSK and/or SSID may be generated by an AP 102, and entered at a client station 104, by activating a hardware and/or software enabled button located on an AP 102, and/or located on a client station 104. Subsequent to configuration, in accordance with various embodiments of the invention, the configured client station 104 may communicate information in a WPA-based WLAN. A client station 104, which is configured with a PSK and/or SSID in accordance with various embodiments of the invention, may communicate in a secure communication network with a WLAN station 106, for which the PSK and/or SSID were not configured in accordance with various embodiments of the invention. For example, the PSK and SSID may be configured at the WLAN station 106 as a result of manual entry by a user.

In an exemplary embodiment of the invention, the AP 102 may be a collocated device 102, functioning as either an access point or as a configurator. Furthermore, the client station 104 may be a rogue client and may attempt to establish a connection with the collocated device 102 functioning as a configurator. For example, the collocated device 102 functioning as a configurator may open a configurator timing window and may communicate authentication enablement information to the rogue client station 104. The collocated device 102 functioning as a configurator may then communicate an indication within a beacon signal, for example, indicating that the collocated device 102 functioning as a configurator is not available for configuration for a remainder of the configurator timing window. A legitimate client station 106 may then attempt to establish communication with the collocated device 102 functioning as a configurator and may detect that the collocated device 102 functioning as a configurator is not available for connection. The legitimate client station 106 may then detect a beacon from the collocated device 102 functioning as a configurator with a recently configured flag TRUE. The legitimate client station 106 may then generate an indication of failed configuration. A remedial action may then be taken, in response to the generated indication. For example, a user of the collocated device 102 functioning as a configurator may notice the generated indication and may cancel the connection with the rogue client station 104.

Figure 1B:
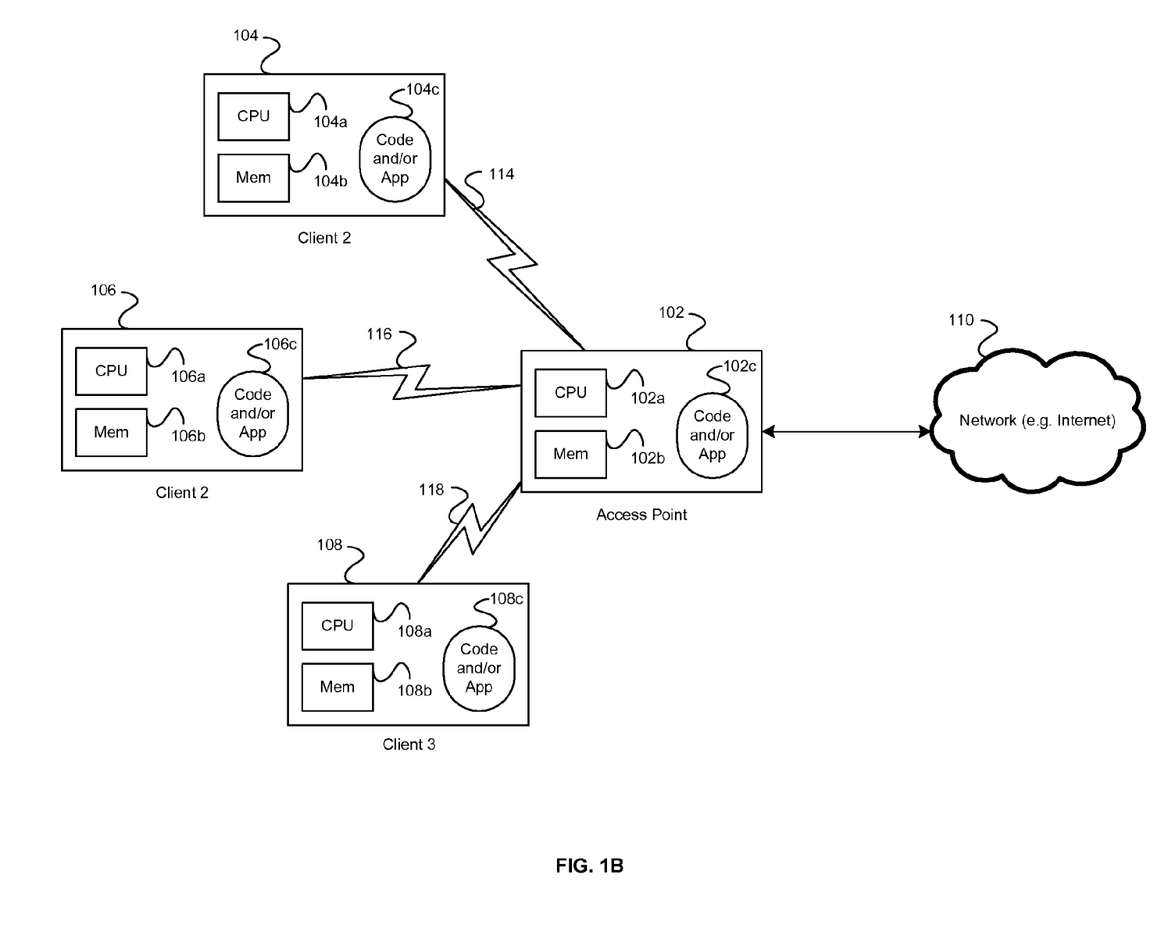
FIG. 1B is a block diagram of a software environment in an exemplary wireless network, which may be utilized in connection with an embodiment of the invention.

FIG. 1B is a block diagram of a software environment in an exemplary wireless network, which may be utilized in connection with an embodiment of the invention. Referring to FIG. 1B, there is shown an access point (AP) 102, and a plurality of client stations (STA) 104, 106, and 108, a plurality of RF channels 114, 116, and 118, and a network 110. The AP 102 may further comprise a central processing unit (CPU) 102a, system memory 102b, and code and/or application software 102c. The STA 104 may further comprise a CPU 104a, system memory 104b, and code and/or application software 104c. The STA 106 may further comprise a CPU 106a, system memory 106b, and code and/or application software 106c. The STA 108 may further comprise a CPU 108a, system memory 108b, and code and/or application software 108c. The AP 102, and the STAs 104, 106 and 108 may be substantially as described in FIG. 1A.

The CPU 102a, 104a, 106a or 108a may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102b, 104b, 106b or 108b may comprise suitable logic, circuitry, and/or code to be utilized to store, or write, and retrieve, or read, information. It may comprise a plurality of memory technologies such as random access memory (RAM). The code and/or application software 102c, 104c, 106c or 108c may comprise a computer program.

In an exemplary embodiment of the invention, the CPU 104a, 106a or 108a may be further adapted to detect unauthorized access attempts by an undesired device such as a rogue client station or a rogue configurator within a wireless network. If a rogue client station or a rogue configurator is detected, the corresponding client stations 104, 106, or 108 may generate a notification. The notification may be communicated to the AP 102, for example, and may indicate that an unauthorized access attempt has been made by an undesired device such as a rogue client station or a rogue configurator.

In operation, the system memory 102b may comprise machine-readable storage having stored thereon at least one code section for enabling communication of information in a secure communication system. The at least one code section may be executable by the CPU 102a. The at least one code section may cause the CPU 102a to perform steps related to registering and configuring a client station 104 with the AP 102.

In operation, the system memory 104b, 106b or 108b may comprise machine readable storage having stored thereon at least one code section for enabling communication of information in a secure communication system. The at least one code section may be executable by the CPU 104a, 106a or 108a, respectively. The at least one code section may cause the CPU 104a, 106a or 108a to perform steps related to requesting registration and configuration of the client station 104, 106 or 108 with the AP 102.

Figure 2A:
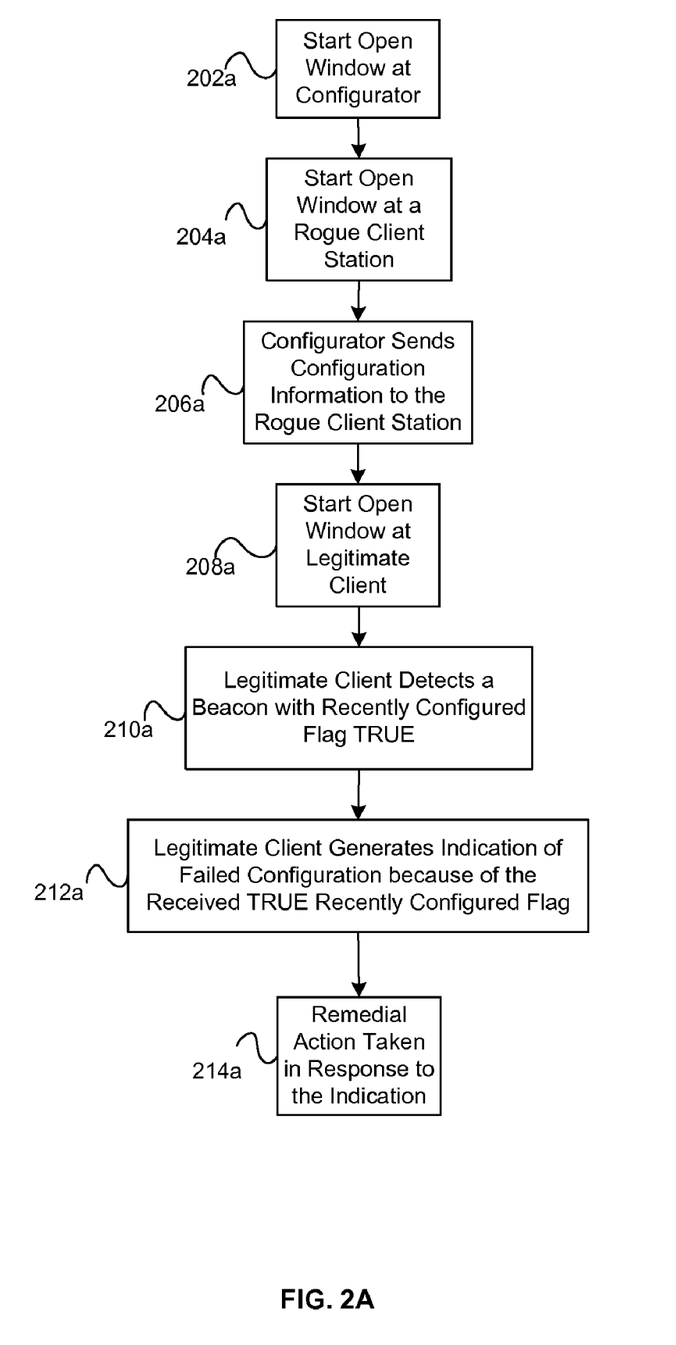
FIG. 2A is a flow diagram illustrating exemplary steps performed during detection of a rogue client station, in accordance with an embodiment of the invention.

FIG. 2A is a flow diagram illustrating exemplary steps performed during detection of a rogue client station, in accordance with an embodiment of the invention. Referring to FIGS. 1A and 2A, at 202a, an open configurator timing window may be started at the collocated device 102 functioning as a configurator. At 204a, an open window may be started at a rogue client station, such as the client station 104. At 206a, the collocated device 102 functioning as a configurator may communicate configuration information to the rogue client station 104. For example, the collocated device 102 functioning as a configurator may communicate a service set identifier (SSID) and/or a passphrase. At 208a, an open window may be started at a legitimate client station, such as client station 106.

In an exemplary embodiment of the invention, after the collocated device 102 functioning as a configurator has established a connection with the rogue client station 104, the collocated device 102 functioning as a configurator may communicate a beacon signal to the legitimate client station 106. The communicated beacon signal may comprise a flag, such as a recently configured flag for example, which may be utilized to notify the legitimate client station 106 that the collocated device 102 functioning as a configurator is not available for configuration for a remainder of the open configurator timing window. At 210a, the legitimate client station 106 may detect a beacon message with a recently configured flag TRUE. At 212a, after the beacon signal is received by the client station 106, the client station 106 may generate an indication, such as an audio or visual indication, of a failed configuration because of the received TRUE recently configured flag. At 214a, a remedial action may be taken in response to the notification. For example, the collocated device 102 functioning as a configurator may cancel the established a connection with the rogue client station 104.

In an exemplary embodiment of the invention, the remedial action may comprise canceling all connections established by the collocated device 102 functioning as a configurator. In certain instances, only a suspect connection may be cancelled or terminated. The collocated device 102 functioning as a configurator may then transmit, after a system reset for example, new beacon signal and configuration information, comprising a new SSID and/or a new passphrase. To prevent subsequent unauthorized access attempts, the configuration information, such as the SSID and/or the passphrase, may be periodically changed by the collocated device 102 functioning as a configurator. The new configuration information may be communicated via an encrypted channel, for example, to one or more legitimate client stations. In another aspect of the invention, the duration of the configurator timing window opened by the collocated device 102 functioning as a configurator may be changed so as to limit the possibility of unauthorized access during the time the window is open.

Figure 2B:
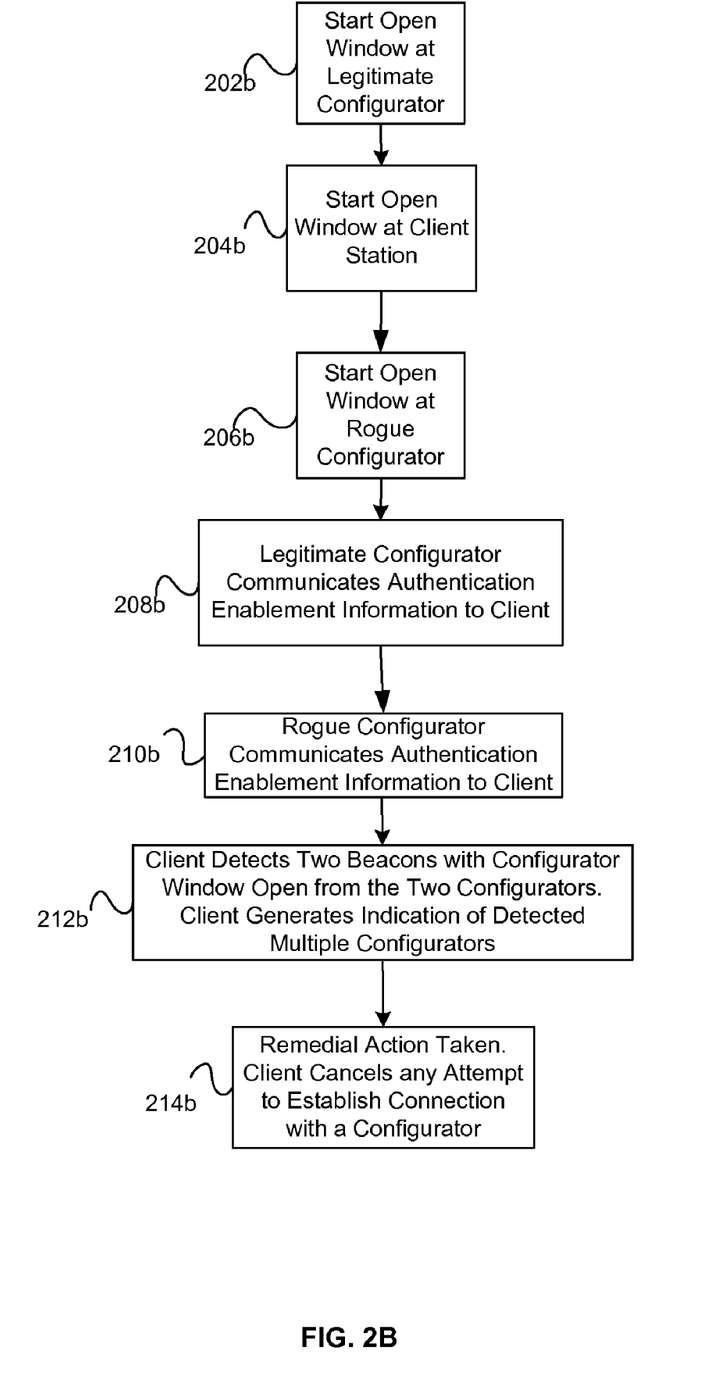
FIG. 2B is a flow diagram illustrating exemplary steps performed during detection of a rogue configurator, in accordance with an embodiment of the invention.

FIG. 2B is a flow diagram illustrating exemplary steps performed during detection of a rogue configurator, in accordance with an embodiment of the invention. Referring to FIGS. 1A and 2B, at 202b, an open window may be started at a legitimate configurator, such as the collocated device 102 functioning as a configurator. At 204b, an open window may then be started at a client station, such as the client station 106. At 206b, an open window may be started at a rogue configurator (not illustrated in FIG. 1A). At 208b, the collocated device 102 functioning as a configurator may communicate authentication enablement information to the client station 106. At 210b, the rogue configurator may communicate authentication enablement information to the client station 106. The rogue configurator may also communicate configuration information, such as an SSID and/or a passphrase to the client station 106. At 212b, the client station 106 may detect two beacon messages from the two configurators with configurator window open. The client station 106 may then generate an indication of the detected multiple configurators. At 214b, remedial action may be taken within the wireless network, in response to the generated indication. The remedial action may comprise canceling any attempts by the client station 106 to establish a connection with any of the configurator devices.

Figure 3A:
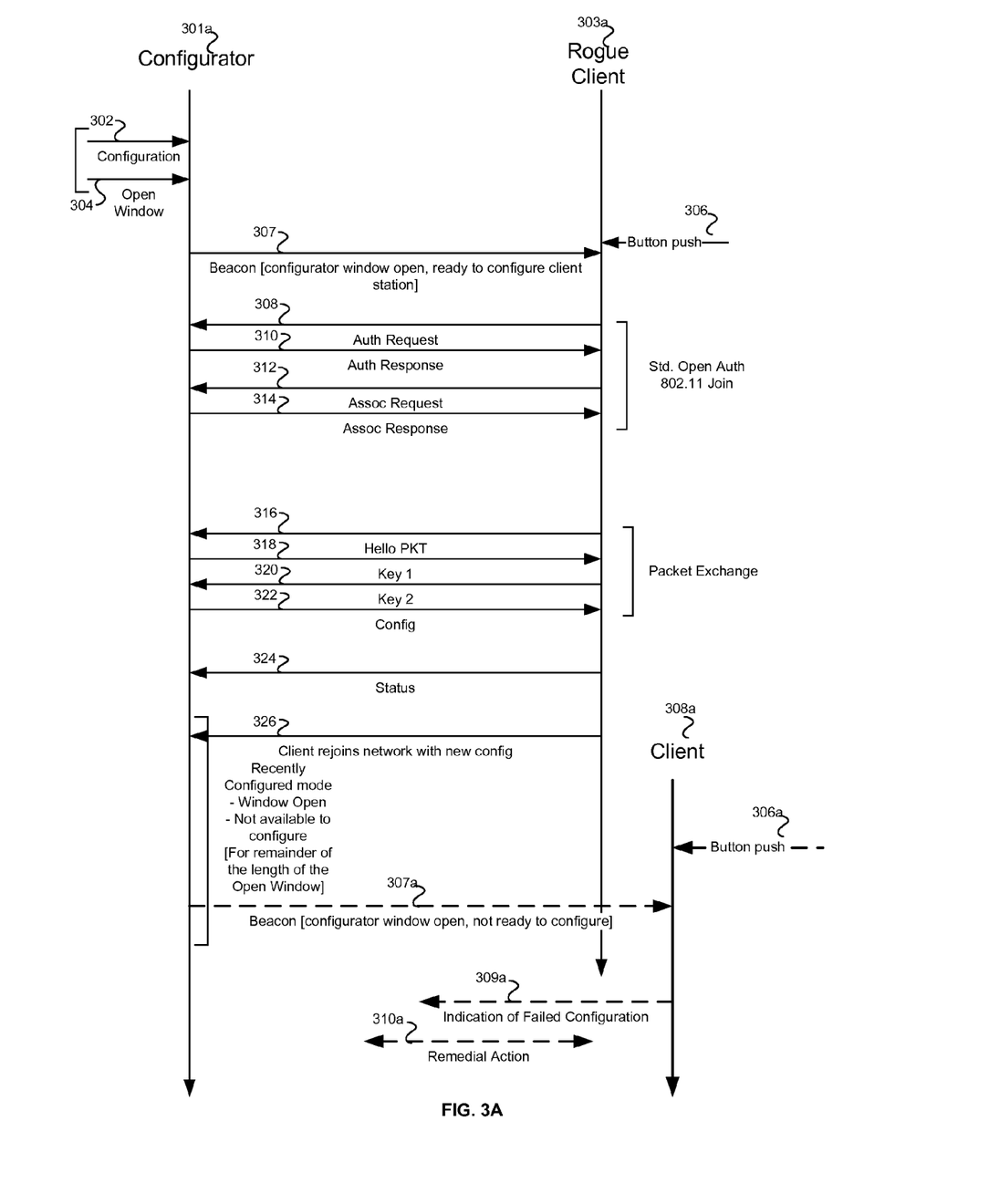
FIG. 3A is a diagram illustrating exemplary message exchanges during detection of a rogue client station, in accordance with an embodiment of the invention.

FIG. 3A is a diagram illustrating exemplary message exchanges during detection of a rogue client station, in accordance with an embodiment of the invention. Referring to FIG. 3A, there is illustrated an exemplary exchange of messages between the configurator 301a and a plurality of client stations, such as the rogue client station 303a and the legitimate client station 308a. In step 302, the configurator 301a may be configured. The information configured in step 302 may be subsequently utilized by the configurator 301a to configure one or more client stations. In step 304, a configurator registration window may be opened at the configurator 301a. In step 306, a window may be opened at the rogue client station 303a. In step 307, the configurator 301a may transmit IEEE 802.11 beacon frames comprising authentication enablement information, in accordance with an embodiment of the invention. The authentication enablement information may indicate that the configurator registration window is open and that the configurator 301a is ready to configure a client station, such as the rogue client station 303a.

Steps 308, 310, 312, and 314 may comprise message exchanges based on IEEE 802.11 comprising an open authentication and join of a basic service set (BSS) as defined in IEEE 802.11. In step 308, an authentication request message may be sent by the rogue client station 303a, to the configurator 301a. In step 310, the configurator 301a may send an authentication response message to the rogue client station 303a. In step 312, the rogue client station 303a may send an association request message 312 to the configurator 301a. In step 314, the configurator 301a may send an association response message 314 to the rogue client station 303a.

Steps 316, 318, 320, and 322 may comprise a packet exchange based on the protocol. In step 316, the rogue client station 303a may communicate a hello packet to the configurator 301a. The hello packet 316 may indicate to the configurator 301a that the rogue client station 303a is ready to be configured. In step 318, the configurator 301a may communicate a key1 message to the rogue client station 303a. The key1 message 318 may comprise a configurator key. In step 320, the rogue client station 303a may communicate a key2 message to the configurator 301a. The key2 message 320 may comprise a client key.

In step 322, the configurator 301a may communicate a configuration message to the rogue client station 303a. The configuration message 322 may comprise configuration information that may be utilized to authenticate the rogue client station 303a. The configuration information communicated in the configuration message 322 may be encrypted based on the configurator key and/or the client key. In step 324, the rogue client station 303a may communicate a status message to the configurator 301a. The status message 324 may be sent subsequent to decryption of at least a portion of the configuration message 322. The rogue client station 303a may utilize the configurator key and/or the client key to decrypt at least a portion of the configuration message 322 that was previously encrypted by the configurator 301a. The status message 324 may indicate whether the rogue client station 303a was successfully configured during the packet exchange. In step 326, the rogue client station 303a may rejoin the WLAN based on the received configuration information. The steps performed during the rejoin 326 may be as defined in IEEE 802.11. The rejoin may occur via a secure RF channel that utilizes the received configuration information in step 322. Subsequent to configuration of the client station 104, the configurator 301a may not be available to configure another client station 106 during the current configurator registration window time interval.

In an exemplary embodiment of the invention, a legitimate client station 308a may attempt to establish communication with the configurator 301a. In step 306a, a window may be opened at the legitimate client station 308a. In step 307a, the configurator 301a may transmit IEEE 802.11 beacon frames comprising authentication enablement information, in accordance with an embodiment of the invention. The authentication enablement information may indicate that the configurator registration window is still open and that the configurator 301a is not available to configure another client station, such as the legitimate client station 308a. For example, the configurator 301a may communicate a beacon with a recently configured flag TRUE, indicating a recent configuration of a client (i.e., the rogue client 303a). After receiving the authentication enablement information from the configurator 301a, in step 309a, the client station 308a may generate an indication, such as an audio or visual indication at the client station 308a, that a configuration attempt has failed. At step 310a, in response to the generated indication, a remedial action may be taken to prevent the unauthorized access by the rogue client station 303a. For example, configurator 301a may cancel or terminate its connection with the rogue client station 303a.

In another embodiment of the invention, the client station 308a may generate an audio and/or visual indication of the failed configuration. In addition, the client station 308a may utilize one or more light emitting diodes (LEDs) to communicate the violation notification. Furthermore, if an LED is utilized, the client station 308a may utilize a blinking or a solid signal to indicate an access violation.

Figure 3B:
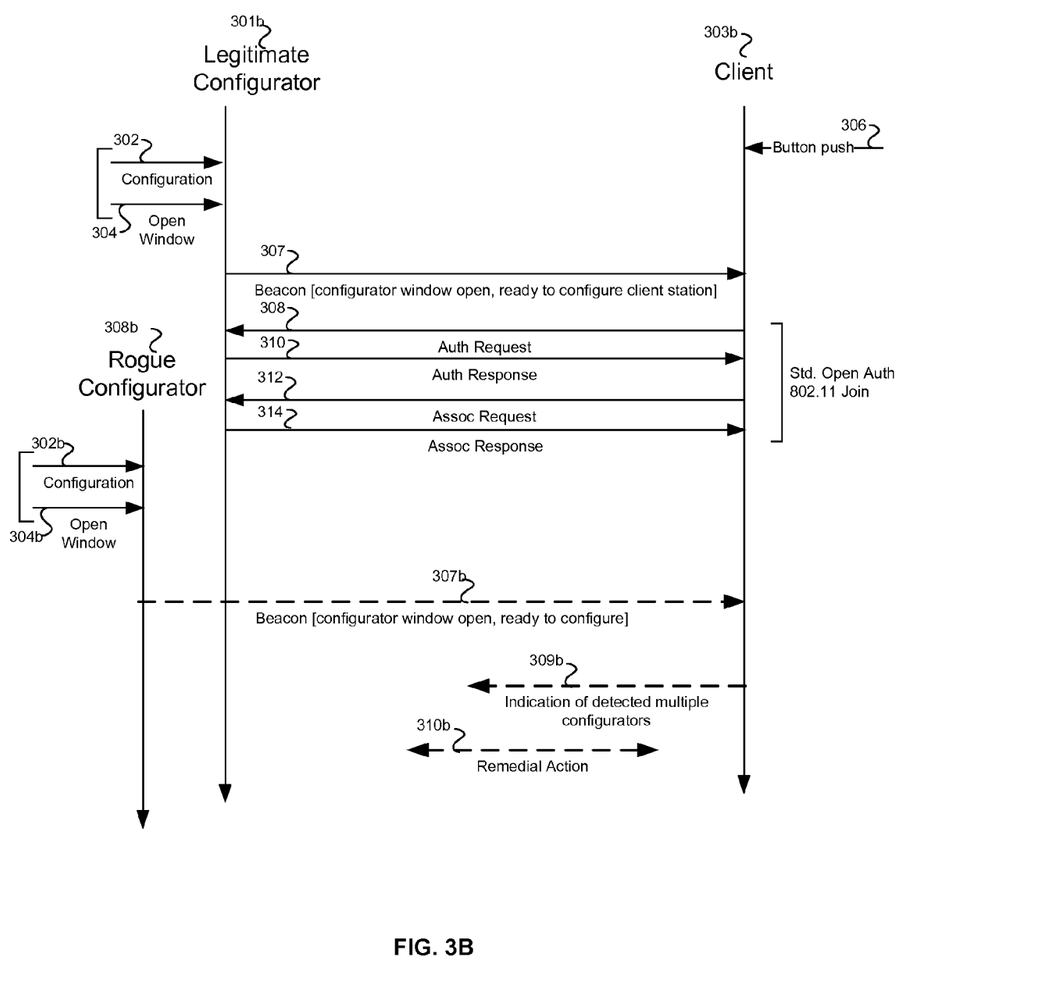
FIG. 3B is a diagram illustrating exemplary message exchanges during detection of a rogue configurator, in accordance with an embodiment of the invention.

FIG. 3B is a diagram illustrating exemplary message exchanges during detection of a rogue configurator, in accordance with an embodiment of the invention. Referring to FIG. 3B, there is illustrated an exemplary exchange of messages between a plurality of configurators, such as a legitimate configurator 301b and a rogue configurator 308b, and a client station 303b. In step 302, the legitimate configurator 301b may be configured. The information configured in step 302 may be subsequently utilized by the legitimate configurator 301b to configure one or more client stations. In step 304, a configurator registration window may be opened at the legitimate configurator 301b. In step 306, a window may be opened at the client station 303b. In step 307, the legitimate configurator 301b may transmit IEEE 802.11 beacon frames comprising authentication enablement information. The authentication enablement information may indicate that the configurator registration window is open and that the legitimate configurator 301b is ready to configure a client station, such as the client station 303b.

Steps 308, 310, 312, and 314 may comprise message exchanges based on IEEE 802.11 comprising an open authentication and join of a basic service set (BSS) as defined in IEEE 802.11. In step 308, an authentication request message may be sent by the client station 303b to the legitimate configurator 301b. In step 310, the legitimate configurator 301b may send an authentication response message to the client station 303b. In step 312, the client station 303b may send an association request message 312 to the legitimate configurator 301b. In step 314, the legitimate configurator 301b may send an association response message 314 to the client station 303a.

In an exemplary embodiment of the invention, a rogue configurator 308b may attempt to establish a communication with the client station 303b. In step 302b, the rogue configurator 308b may be configured. The information configured in step 302b may be subsequently utilized by the configurator 308b to configure one or more client stations. In step 304, a configurator registration window may be opened at the rogue configurator 308b. In step 307b, the configurator 308b may transmit IEEE 802.11 beacon frames comprising authentication enablement information, in accordance with an embodiment of the invention.

The authentication enablement information may indicate that the configurator registration window is still open and that the configurator 308b is available to configure another client station, such as the client station 303b. After receiving the authentication enablement information from the configurator 308b, in step 309a, the client station 303b may detect two beacons with configurator windows open from the configurators 301b and 308b. The client 303b may then generate an indication of detected multiple configurators. At step 310b, in response to the generated indication of detected multiple configurators, a remedial action may be taken to prevent the unauthorized access by the rogue configurator 308b. For example, the client 303b may cancel any attempt from a configurator to establish a connection.

Aspects of the present invention may be utilized in a system for preventing accidental connection by an additional configurator to a connection between a legitimate configurator and a client. For example, a legitimate configurator and a client may be located in a first residence and the additional configurator may be located in a neighboring residence. In this regard, accidental connection by the additional configurator in the neighboring residence may be prevented as described herein above with respect to at least FIGS. 2B and 3B.

Another aspect of the present invention may be utilized in a system for preventing a malicious attack by a rogue configurator. In this regard, attempt for a malicious connection by a rogue configurator may be prevented as described herein above with respect to at least FIGS. 2B and 3B.

Figure 4:
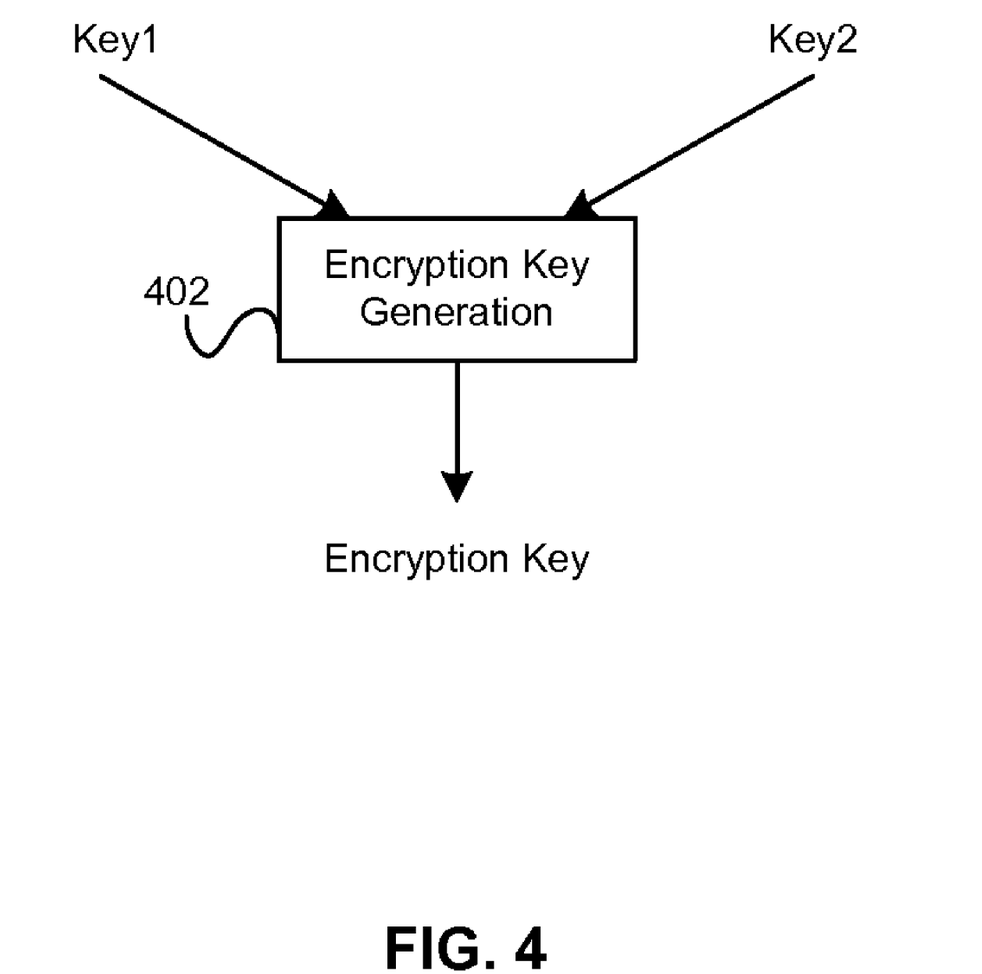
FIG. 4 is a block diagram illustrating exemplary encryption key generation based on keys, which may be utilized in connection with an embodiment of the invention.

FIG. 4 is a block diagram illustrating exemplary encryption key generation based on keys, which may be utilized in connection with an embodiment of the invention. Referring to FIG. 4, there is shown an encryption key generation block 402. The encryption key generation block 402 may utilize a key1, for example a configurator key received in a key1 message 318, and/or a key2, for example, a client key received in a key2 message 320, to generate an encryption key, as illustrated in FIG. 3A. The encryption key may be utilized to encrypt configuration information that is communicated in a configuration message 322, by a configurator 102 to a client station 104.

Figure 5:
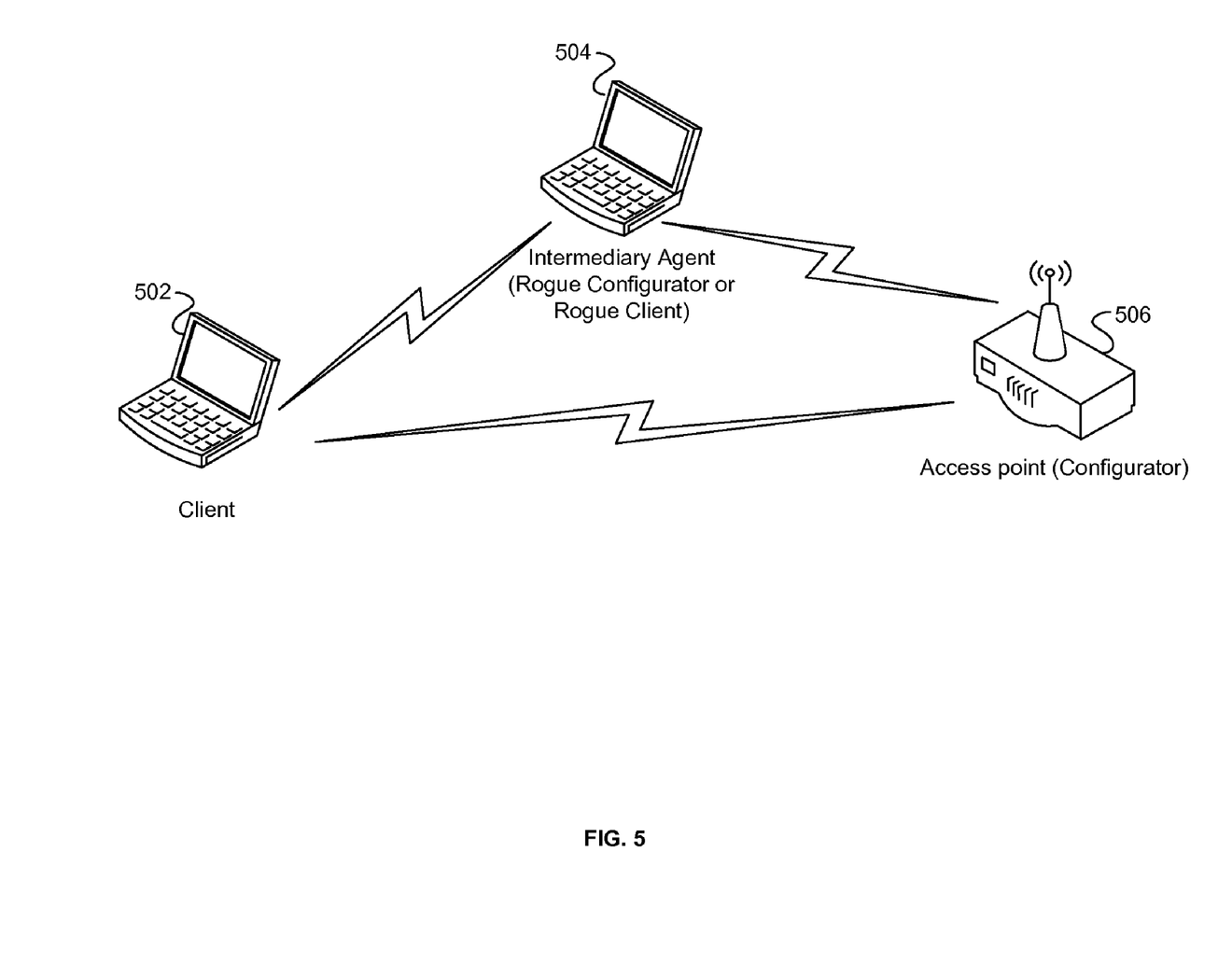
FIG. 5 is diagram illustrating an exemplary intermediary agent attack during authentication, which may occur in connection with an embodiment of the invention.

FIG. 5 is diagram illustrating an exemplary intermediary agent attack during authentication, which may occur in connection with an embodiment of the invention. Referring to FIG. 5, there is shown a client station 502, an intermediary agent 504, and an AP 506. The AP 506 may be utilized as a configurator. The intermediary agent may be adapted to present itself as a client (i.e., a rogue client) to the configurator 506, and as a configurator (i.e., a rogue configurator) to the client 502. In this regard, the intermediary agent 504 may attempt to intercept messages sent by the client station 502, and block their reception at the configurator 506 via an RF channel. For example, the intermediary agent 504 may act as a rogue configurator and may attempt to make an authorized connection with the client station 502. Similarly, the intermediary agent 504 may act as a client station and may attempt to make an authorized connection with the configurator 506. The protocol as illustrated in FIGS. 3A and 3B may be utilized to reduce the ability of the intermediary agent 504 to gain unauthorized access to the configurator 506 or the client station 502, and subsequently gain unauthorized access to the WLAN.

Figure 6:
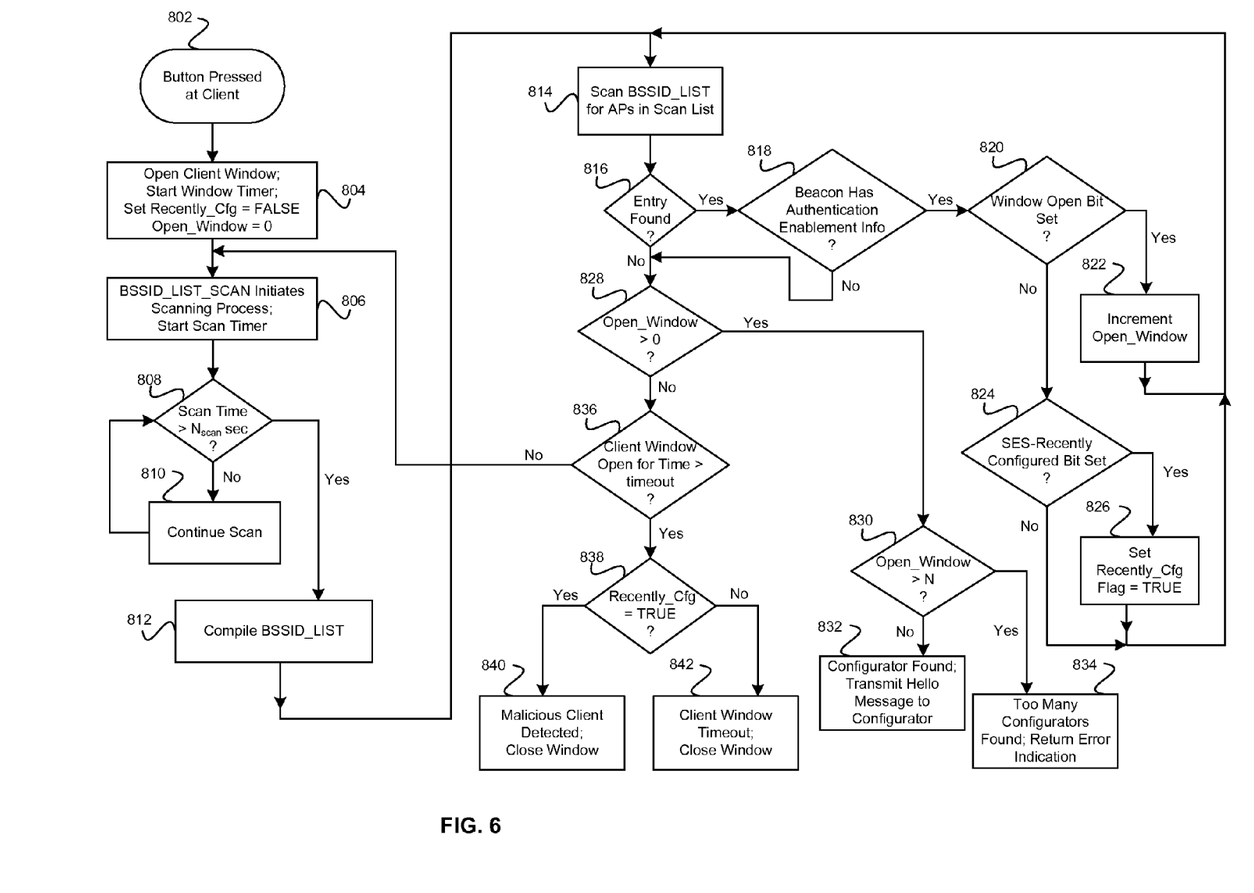
FIG. 6 is a flow diagram illustrating exemplary steps in a discovery protocol, in accordance with an embodiment of the invention.

FIG. 6 is a flow diagram illustrating exemplary steps in a discovery protocol, in accordance with an embodiment of the invention. Referring to FIGS. 1A and 6, the discovery protocol comprises a process by which a client station 104 may locate a collocated device 102 functioning as a configurator, with which to initiate an authentication exchange, as described in FIG. 3A or 3B, for example. With reference to FIG. 6, in step 802, a button may be activated at the client station 104. In step 804, a client window may be opened, a window timer that may determine a time duration for which the client window is to remain open may be started, the flag may be set recently_cfg=FALSE, and the counter may be set open_window=0. The flag recently_cfg may indicate whether a located configurator has already configured a client in the current configurator timing window open time interval. The counter open_window may indicate a number of collocated configurator and access points 102 functioning as configurators, located, by a client station 104, for which the configurator timing window is open.

In step 806, the BSSID_LIST_SCAN directive may initiate a scanning process at the client station 104. The scanning process may comprise steps that are performed by the client station 104 to locate a collocated device functioning as a configurator, for example. A corresponding scan timer may be started that defines a duration of a time interval during which the scanning process will be executed at the client station 104. The identifier BSSID_LIST_SCAN may, for example, represent an object identifier (OID), in accordance with the network driver interface specification (NDIS) that may be utilized to initiate a search for APs at the client station 104. The client station 104 may attempt to locate collocated configurator and access points 102 functioning as APs, in a BSS 202. Step 808 may determine if the scanning process time interval has expired. The client station may attempt to scan for a time interval that comprises $N_{scan}$ seconds, for example $N_{scan}$=6, from the time instant at which the scan timer was started. If the scanning time interval has not expired, step 810 may continue scanning at step 808.

At step 812, the BSSID_LIST may comprise a listing of information received from beacon frames received from collocated configurator and access points 102 functioning as APs that were located by the client station 104 during the scan. The list may comprise zero, or a plurality of entries. Each entry in the list may comprise information that was received in a beacon frame by the client station 104. The received beacon frame may or may not comprise authentication enablement information. In step 814, the BSSID_LIST may be scanned to detect information received from a collocated device 102 functioning as a configurator. At step 816, if a list entry is found, step 818 may determine if the beacon frame associated with the entry contains the authentication enablement information. If the beacon frame for the entry does contain authentication enablement information, step 820 may determine if the window_open flag is set in the list entry. If the window_open flag is set to a value TRUE, this may indicate that a collocated device 102, functioning as a configurator, has been located that is ready to configure a client station 104. Step 822 may increment the value of the counter open_window. If the flag window_open is not set to a value TRUE, step 824 may determine if the flag recently_cfg is set to a value TRUE in the list entry. If the flag recently_cfg is set to a value TRUE in the list entry, step 826 may set the recently_cfg flag, which is utilized by the discovery protocol, equal to a logical value TRUE.

If no entry is found at step 816, step 828 may determine if the current value of the counter open_window is greater than 0. If the value of the counter open_window is greater than 0, step 830 may determine if the current value of the counter open_window is greater than the value N, where N may be a threshold value, N=1, for example. If the counter open_window is not greater than N, step 832 may determine that at least one collocated device 102 functioning as a configurator, has been found. Subsequently, the client station 104 may communicate a hello packet, associated with the step 616, to the collocated device 102, functioning as a configurator. If the value of the counter open_window is greater than N, step 834 may generate an error indication. The error indication generated in step 834 may be displayed in a user interface at the client station 104. In an exemplary aspect of the invention, the error indication 834 may comprise a violation notification by a client station, indicating unauthorized access by a rogue configurator. For example, the error indication 834 may be similar to the violation notification 309b illustrated in FIG. 3B, with regard to detecting the rogue configurator 301b.

If the value of the counter open_window is not found to be greater than 0 at step 828, step 836 may determine if the client timing window has been open for a period of time greater than the configured timeout period for the client station 104. If the client timing window has not been open for a period of time greater than the timeout period the discovery process may continue to scan for beacon frames received from a collocated device 102, functioning as an access point at step 806. If the client timing window has been open for a period of time greater than the timeout period, step 838 may determine if the flag recently_cfg is set to indicate a value TRUE. If the flag recently_cfg=TRUE, step 840 may detect a malicious client station, and close the client timing window. A malicious client station may be an unauthorized wireless terminal device that has been configured by the collocated device 102, functioning as a configurator, during the current configurator timing window open time duration. If the flag recently_cfg is not equal to TRUE, step 842 may detect a client window timeout. The client timing window may be subsequently closed.

In an exemplary aspect of the invention, the malicious client station detection in step 840 may further comprise a violation notification, for example, indicating unauthorized access by a rogue client station. For example, the violation indication which may be communicated in step 840 may be similar to the violation notification 309a illustrated in FIG. 3A, with regard to detecting an undesired device such as a rogue client station 303ab.

Figure 7:
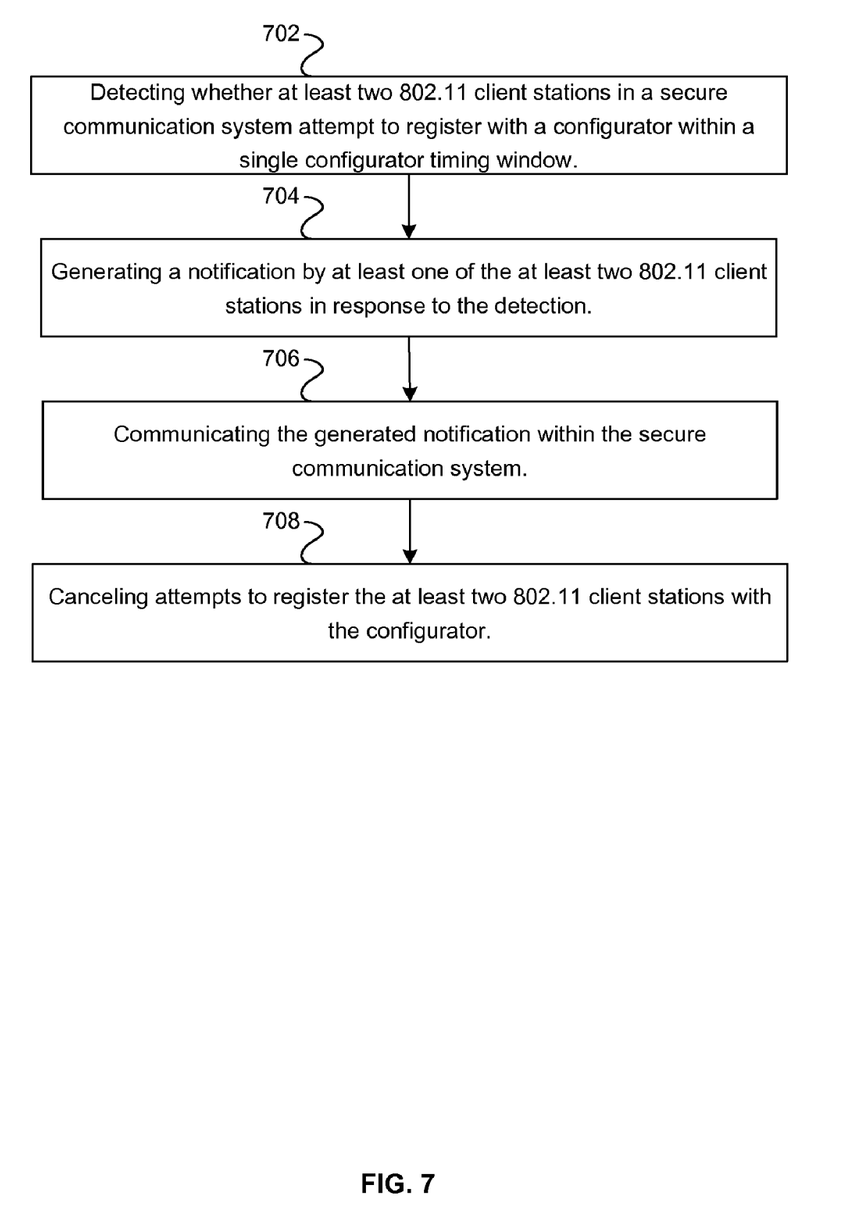
FIG. 7 is a flow diagram illustrating exemplary steps for enabling communication of information in a secure communication system, in accordance with an embodiment of the invention.

FIG. 7 is a flow diagram illustrating exemplary steps for enabling communication of information in a secure communication system, in accordance with an embodiment of the invention. Referring to FIGS. 1A and 7, at 702, it may be detected whether at least two 802.11 client stations, such as client stations 104 and 106 in a secure communication system, attempt to register with a configurator 102 within a single configurator timing window. At 704, at least one of the at least two 802.11 client stations 104 and 106 may generate a notification in response to the detection. At 706, the generated notification may be communicated within the secure communication system. At 708, attempts to register the at least two 802.11 client stations 104 and 106 with the configurator 102 may be canceled. A machine-readable storage having stored thereon, a computer program having at least one code section for enabling communication of information in a secure communication system, the at least one code section being executable by a machine for causing the machine to perform steps comprising as described herein for generating a notification when at least two 802.11 client stations attempt to register within a single configurator timing window.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information in a secure communication system, the method comprising: generating a notification when at least two configurators attempt to separately register with an 802.11 client station within a single configurator timing window.

2. The method according to claim 1, comprising detecting whether said at least two configurators attempt to register with said 802.11 client station within said single configurator timing window time duration.

3. The method according to claim 2, comprising generating said notification in response to said detecting.

4. The method according to claim 1, comprising receiving by said 802.11 client station, configuration information from at least a first of said at least two configurators, prior to said generation of said notification.

5. The method according to claim 4, wherein said configuration information comprises one or both of a service set identifier (SSID) and/or a passphrase.

6. The method according to claim 1, wherein said notification comprises an indication of detected multiple configurators.

7. The method according to claim 1, comprising canceling at least one attempt by one or both of said at least two configurators to establish a connection with said 802.11 client station, after said generating of said notification.

8. The method according to claim 1, comprising configuring a duration for which said configurator timing window remains open.

9. The method according to claim 1, wherein said notification comprises one or both of an audio notification and/or a visual notification.

10. The method according to claim 9, comprising generating said visual notification utilizing at least one LED located on said 802.11 client station.

11. A system for enabling communication of information in a secure communication system, the system comprising: at least one processor for use in an 802.11 client station, said at least one processor generates a notification when at least two configurators attempt to separately register with said 802.11 client station within a single configurator timing window.

12. The system according to claim 11, wherein said at least one processor detects whether said at least two configurators attempt to register with said 802.11 client station within said single configurator timing window time duration.

13. The system according to claim 12, wherein said at least one processor generates said notification in response to said detecting.

14. The system according to claim 11, wherein said at least one processor receives configuration information from at least a first of said at least two configurators, prior to said generation of said notification.

15. The system according to claim 14, wherein said configuration information comprises one or both of a service set identifier (SSID) and/or a passphrase.

16. The system according to claim 11, wherein said notification comprises an indication of detected multiple configurators.

17. The system according to claim 11, wherein said at least one processor cancels at least one attempt by one or both of said at least two configurators to establish a connection with said 802.11 client station, after said generating of said notification.

18. The system according to claim 11, wherein said at least one processor configures a duration for which said configurator timing window remains open.

19. The system according to claim 11, wherein said notification comprises one or both of an audio notification and/or a visual notification.

20. The system according to claim 19, wherein said at least one processor generates said visual notification utilizing at least one LED located on said 802.11 client station.

21. A machine-readable storage, having stored thereon a computer program having at least one code section for enabling communication of information in a secure communication system, the at least one code section executable by a machine for causing the machine to perform the steps comprising: generating a notification when at least two configurators attempt to separately register with an 802.11 client station within a single configurator timing window.

22. The machine-readable storage according to claim 21, comprising code for detecting whether said at least two configurators attempt to register with said 802.11 client station with said single configurator timing window time duration.

23. The machine-readable storage according to claim 22, comprising code for generating said notification in response to said detecting.

24. The machine-readable storage according to claim 21, comprising code for receiving by said 802.11 client station, configuration information from at least a first of said at least two configurators, prior to said generation of said notification.

25. The machine-readable storage according to claim 24, wherein said configuration information comprises one or both of a service set identifier (SSID) and/or a passphrase.

26. The machine-readable storage according to claim 21, wherein said notification comprises an indication of detected multiple configurators.

27. The machine-readable storage according to claim 21, comprising code for canceling at least one attempt by one or both of said at least two configurators to establish a connection with said 802.11 client station, after said generating of said notification.

28. The machine-readable storage according to claim 21, comprising code for configuring a duration for which said configurator timing window remains open.

29. The machine-readable storage according to claim 21, wherein said notification comprises one or both of an audio notification and/or a visual notification.

30. The machine-readable storage according to claim 29, comprising code for generating said visual notification utilizing at least one LED located on said 802.11 client station.

31. A system for enabling communication of information in a secure communication system, the system comprising: at least one processor for use in an 802.11 client station that generates a notification when said at least one 802.11 client station and at least one other 802.11 client station attempt to separately register with a configurator within a single configurator timing window.

32. The system according to claim 31, wherein said at least one processor detects whether said at least one 802.11 client station and said at least one other 802.11 client station attempt to register with said configurator within said single configurator timing window.

33. The system according to claim 32, wherein said at least one processor generates said notification in response to said detecting.

34. The system according to claim 31, wherein said configurator communicates configuration information to said at least one processor, prior to said generation of said notification.

35. The system according to claim 34, wherein said configurator changes at least a portion of said configuration information over time.

36. The system according to claim 34, wherein said configuration information comprises one or both of a service set identifier (SSID) and/or a passphrase.

37. The system according to claim 34, wherein said configurator communicates additional configuration information to at least a second of said at least two 802.11 client stations, in response to said generation of said notification.

38. The system according to claim 31, wherein said configurator configures duration for which said configurator timing window remains open.

39. The system according to claim 31, wherein said notification comprises one or both of an audio notification and a visual notification.

40. The system according to claim 39, wherein said at least one processor generates said visual notification utilizing at least one LED located on one or more of said at least two 802.11 client stations.

41. The system according to claim 31, wherein said notification comprises an indication of failed configuration of said 802.11 client station.

42. The system according to claim 31, wherein said configurator cancels connection with said at least one other 802.11 client station upon receiving of said notification.

* * * * *